July 27, 1937.　　　A. ZOLA ET AL　　　2,087,932
DENTAL STOOL
Filed Jan. 16, 1935
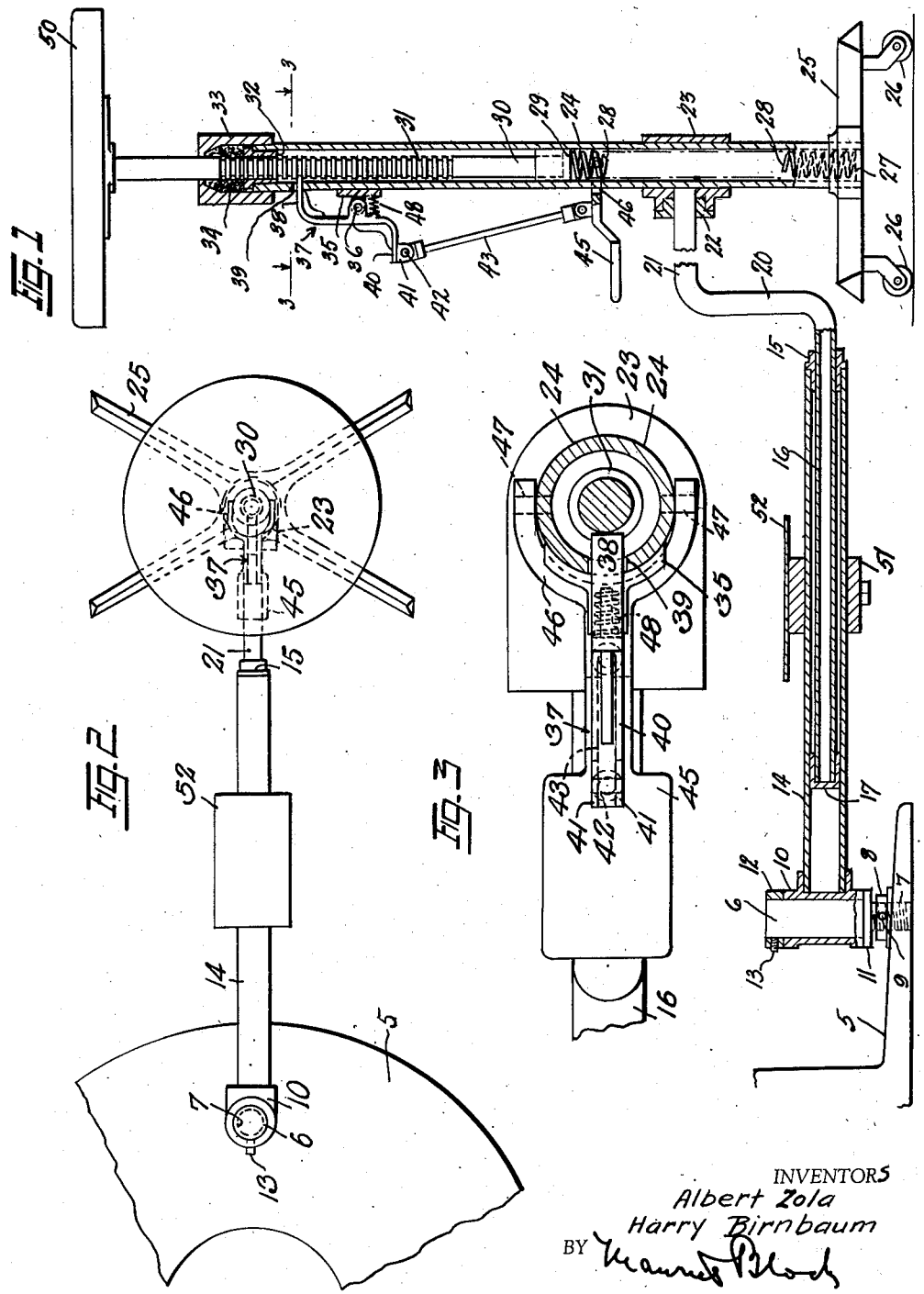
INVENTORS
Albert Zola
Harry Birnbaum
BY
ATTORNEY.

Patented July 27, 1937

2,087,932

UNITED STATES PATENT OFFICE 2,087,932

DENTAL STOOL

Albert Zola and Harry Birnbaum, New York, N. Y.

Application January 16, 1935, Serial No. 1,996

3 Claims. (Cl. 155—81)

This invention relates to adjustable stools and more particularly to such stools which are adapted for dentist use.

One object of the invention is the provision of a stool of the character referred to which will enable the dentist who is operating upon a patient, to sit upon the stool and to change his position relative to the patient and his height without manual manipulation.

Another object of the invention is to provide such a stool which may be pivotally secured to the base of a dental chair, so that it may be swung about the said pivot to assume different angular positions relative to the patient, and also to move the stool to and from the patient by the exertion of pressure by the dentist's feet upon the floor while the dentist is sitting upon the stool.

A further object of the invention is to provide means for raising or lowering the stool by the use of the feet.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described, and illustrated in the accompanying drawing, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawing, in which—

Figure 1 is a side view partly in section of our improved dental stool.

Figure 2 is a top plan view thereof, and

Figure 3 is a sectional view at an enlarged scale, taken on line 3—3, Figure 1.

Referring now to the drawing in detail 5 indicates the base of a dentist's operating chair in which the pivotal connecting post or stud 6 of our improved dental stool is screw-threadedly maintained by means of a reduced screw-threaded or serrated portion 7. The post 6 is locked in place by means of a locking collar 8 and set screw 9.

Pivotally mounted upon the stud or post 6 is a pipe fitting or T 10 which rests upon a shoulder or flange 11 of the stud 6, and the said T is maintained in place upon the said stud by a cap or collar 12 secured in place by a set screw 13. Extending laterally from the said pipe fitting 10 is a pipe 14 provided at its outer end with a bushing 15 through which there suitably passes a pipe 16, the inner end of which is provided with a spacing bushing 17. The fit between the bushing 17 and the inner bore of the pipe 14, and the pipe 16 and inner bore of the bushing 15 is such that the said parts will not move relatively to each other without the exertion of a reasonable amount of force.

The pipe 16 is bent to form a vertical portion 20 and an upper horizontal section 21 which fits into a reducing bushing 22 suitably maintained in a pipe fitting or T 23 secured to a vertical hollow post 24 supported in a base 25 mounted on wheels or casters 26. The tubular or hollow post 24 is closed at the bottom thereof by means of a plug 27 upon which one end of a coiled spring 28 rests and exerts a tension against the bottom of a bushing or cap 29 which is slidable in the said post 24 and supports the lower end of a rod or post 30 provided with a serrated or threaded portion 31 which passes through bushing 32 in the upper end of the tubular post 24. Fitting over the said upper end of the post 24 is a packing gland 33 provided with a felt or other suitable packing washer 34. The said washer may be utilized to regulate the speed of rise of the stool; that is to say, if the gland 33 is forced down upon the hollow stem or post 24, the taper in the said gland will tighten the washer about the stem or post 30, thus retarding the upward movement of the stool. Likewise, the speed of the movement of the stool may be increased by loosening the gland 33, thus giving the spring 28 freer action to press the stool upwardly.

Secured to the post 24 is a bracket 35 upon which there is pivotally mounted as at 36, a lever 37 having an upper horizontal arm 38 which passes through a slot 39 in the post 24 and engages the serrated portion 31 of the rod 30. The said lever 37 is further provided with a lower horizontal arm 40 having ears 41 between which there is pivotally mounted upon a pin 42 a connecting rod 43 similarly connected to a treadle or foot lever 45 having a bifurcated end 46 pivotally secured by means of pins 47 to the post 24. A tension spring 48 (Figs. 1 and 3) normally maintains the lever arm 38 in engagement with one of the serrations 31. A seat 50 is secured to the top of the rod 30. If desirable, a bracket 51 may be supported on the pipe 14, the said bracket having a plate 52 secured thereto for supporting a rheostat or switch for the dentist's engine.

The operation of the device is as follows:

By pressing one or both feet against the floor, the dentist, while seated on the seat 50 may slide the tubes 14 and 16 inwardly or outwardly of each other, thus moving the stool inwardly or outwardly to any desired position, and he may also by the use of his feet swing the stool to the desired angular position with respect to the patient. Again, by pressing the foot lever 45 while off the stool, same may be raised to any desired height by the pressure of the spring 28, and while seated, the weight of the occupant will lower the stool when the foot lever is manipulated.

From the foregoing, it will be seen that the stool is so constructed that all the various adjustments, to wit, laterally and also up and down, are accomplished by the foot of the dentist and no hand manipulation is required, it being desirable in dental work that the dentist keep his hands free from contact with any article. So by the use of this stool, the dentist need not first adjust his chair with his hands and then wash same so as to be able to aseptically operate on his patient.

It will further be seen that the stool can be readily attached to any standard dentist chair as all that will be needed is to provide a threaded opening in the base thereof.

Furthermore, it will be understood that the stool when not in use may be easily swung out of the way about the pivotal stud 6.

Having described our invention, what we claim as new and desire to secure by Letters Patent is:

1. In combination with an operating chair having an enlarged base for its pedestal, a wheeled stool comprising a base, a hollow post, a serrated rod slidable vertically in said post, a spring in said post urging said rod upwardly, a seat carried by said rod, a spring pressed lever pivotally mounted on the post and having an arm normally in engagement with the serrated rod to hold the rod and seat in a vertically adjusted position, a pivotally mounted foot pedal carried by said post below said lever, means connecting the lever to the foot pedal for moving the arm of the lever out of engagement with the serrated rod and permitting vertical movement of the serrated rod and the seat carried thereby when the pedal is operated, a pivot post rising from the base of said pedestal, a fitting rotatable about the pivot post, and a connector between the fitting and the hollow post.

2. In combination with an operating chair having an enlarged base for its standard, a post connected at its lower end with said base and spaced radially from the standard, a flange carried by said post above said base adjacent thereto, a fitting rotatable about said post resting upon said flange and having a side arm, a collar secured about said post above said fitting to maintain the fitting upon the post, an outer tube secured to said arm and projecting radially from said fitting a short distance above the base, a wheeled chair, an inner tube carried by said wheeled chair and extending laterally therefrom and telescopically received in the outer tube, a bracket secured about the outer tube, and a support carried by said bracket above the outer tube adapted to form a foot rest for an operator occupying the wheeled chair and simultaneously support an instrument used by the operator.

3. In combination with an operating chair having an enlarged base for its pedestal, a vertically and laterally adjustable wheeled stool comprising a base, a hollow post rising from said base, a serrated rod slidable in the post and projecting from the upper end thereof, a spring urging said rod upwardly, an adjustable packing carried by said post about the rod, a seat carried by the upper end of said rod, a spring-pressed pivotally mounted lever on the post normally in operative engagement with the serrated rod to hold the rod and seat against downward movement, a pivotally mounted foot pedal, a pitman connecting the lever to the foot pedal, a pivot post rising from the base of said pedestal, a fitting rotatable about the pivot post, an outer tube carried by and extending laterally from the fitting, and an inner tube slidable in the outer tube and connected to the hollow post for rotation about the same.

ALBERT ZOLA.
HARRY BIRNBAUM.